United States Patent [19]

Irie et al.

[11] Patent Number: 4,484,875
[45] Date of Patent: Nov. 27, 1984

[54] TIRE VULCANIZING PRESS

[75] Inventors: Nobuhiko Irie; Akira Hasegawa, both of Nagasaki, Japan

[73] Assignee: Mitsubishi Jukogyo Kabushiki Kaisha, Japan

[21] Appl. No.: 513,064

[22] Filed: Jul. 12, 1983

[30] Foreign Application Priority Data

Jul. 14, 1982 [JP] Japan .................... 57-122606
Jul. 22, 1982 [JP] Japan .................... 57-127847

[51] Int. Cl.³ .................... B29H 5/02; B29H 5/08
[52] U.S. Cl. .................... 425/47; 425/451.2
[58] Field of Search .................... 425/47, 451.2, 590, 425/595

[56] References Cited

U.S. PATENT DOCUMENTS

| 2,689,978 | 9/1954 | Roger | 425/451.2 |
| 2,718,663 | 9/1955 | Roger | 425/451.2 |
| 3,156,014 | 11/1964 | Wenger | 425/595 X |
| 3,263,277 | 8/1966 | Ohlendorf et al. | 425/451.2 |
| 3,270,372 | 9/1966 | Hesse | 425/451.2 |
| 3,666,387 | 5/1972 | Cyriax | 425/590 X |
| 3,669,593 | 6/1972 | Cyriax | 425/451.2 X |
| 3,716,323 | 2/1973 | Classen | 425/451.2 |
| 3,737,278 | 6/1973 | Putzler | 425/451.2 |
| 3,768,953 | 10/1973 | Dangremond et al. | 425/451.2 |
| 3,829,266 | 8/1974 | Melcher | 425/451.2 X |
| 3,918,861 | 11/1975 | Klose | 425/47 |
| 4,032,277 | 6/1977 | Linde et al. | 425/451.2 X |
| 4,130,384 | 12/1978 | MacMillan | 425/451.2 X |
| 4,245,971 | 1/1981 | MacMillan | 425/47 |
| 4,318,682 | 3/1982 | Larson et al. | 425/47 X |
| 4,383,808 | 5/1983 | Kubo et al. | 425/47 |
| 4,383,816 | 5/1983 | Kumazaki | 425/47 |
| 4,448,575 | 5/1984 | Hanyu et al. | 425/451.2 |

FOREIGN PATENT DOCUMENTS

1127069 4/1962 Fed. Rep. of Germany.
2036655 12/1970 France .................... 425/451.2

Primary Examiner—Jay H. Woo
Assistant Examiner—James C. Housel
Attorney, Agent, or Firm—McGlew and Tuttle

[57] ABSTRACT

An improved tire vulcanizing press includes an upper frame, a lower frame and side frames by way of which the upper frame and the lower frame are integrally connected to one another, wherein a lower die half is fixedly mounted on the lower frame and an upper die half is fixedly secured to a raising and lowering table adapted to be raised up or lowered by means of a raising and lowering mechanism fixedly attached to the upper frame in such a manner that the upper die half is displaced away from or toward the lower die half. The improvement consists in that a working cylinder, a spacer and a distance plate are arranged between the upper frame and the upper die half, the distance plate being adapted to move from the operative position in the vulcanizing press to the inoperative one located outward of the latter and vice versa, and a die thickness adjusting mechanism arranged on either of the upper frame and the lower frame whereby a vulcanizing operation is safely carried out with a minimal die opening in the event of a malfunction caused with respect to the working cylinder.

11 Claims, 10 Drawing Figures

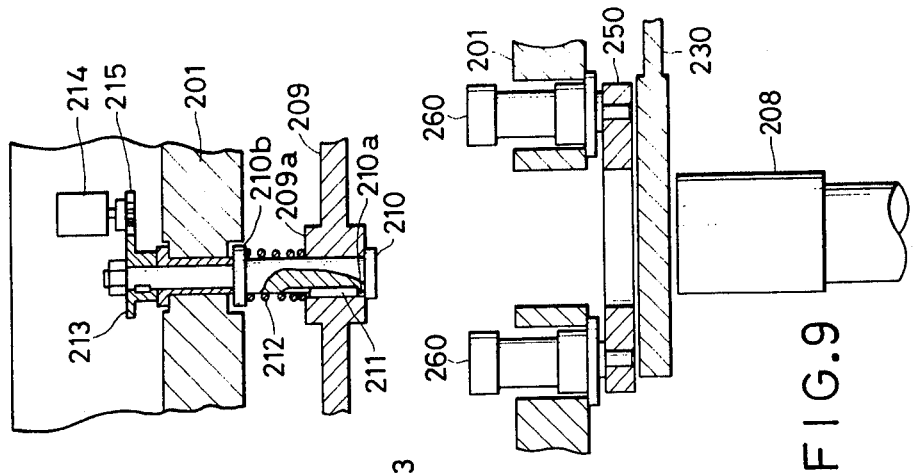
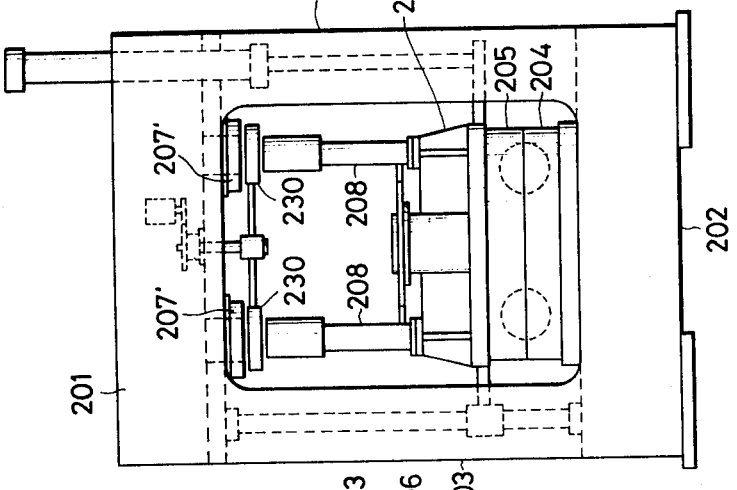
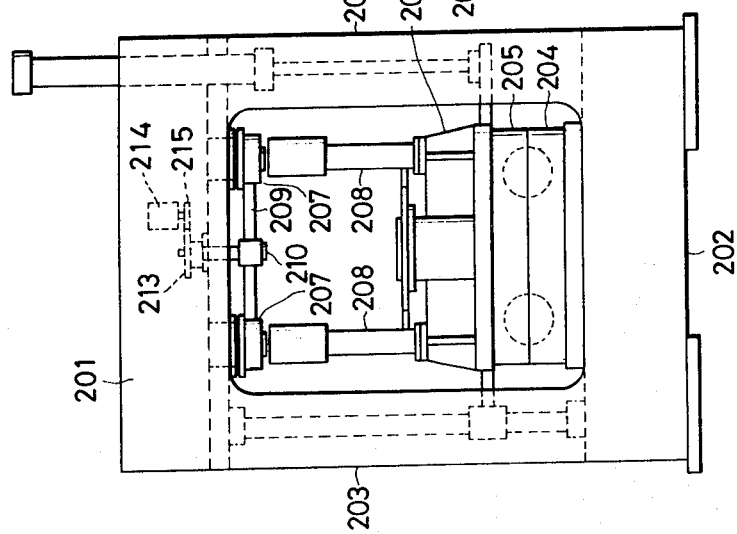

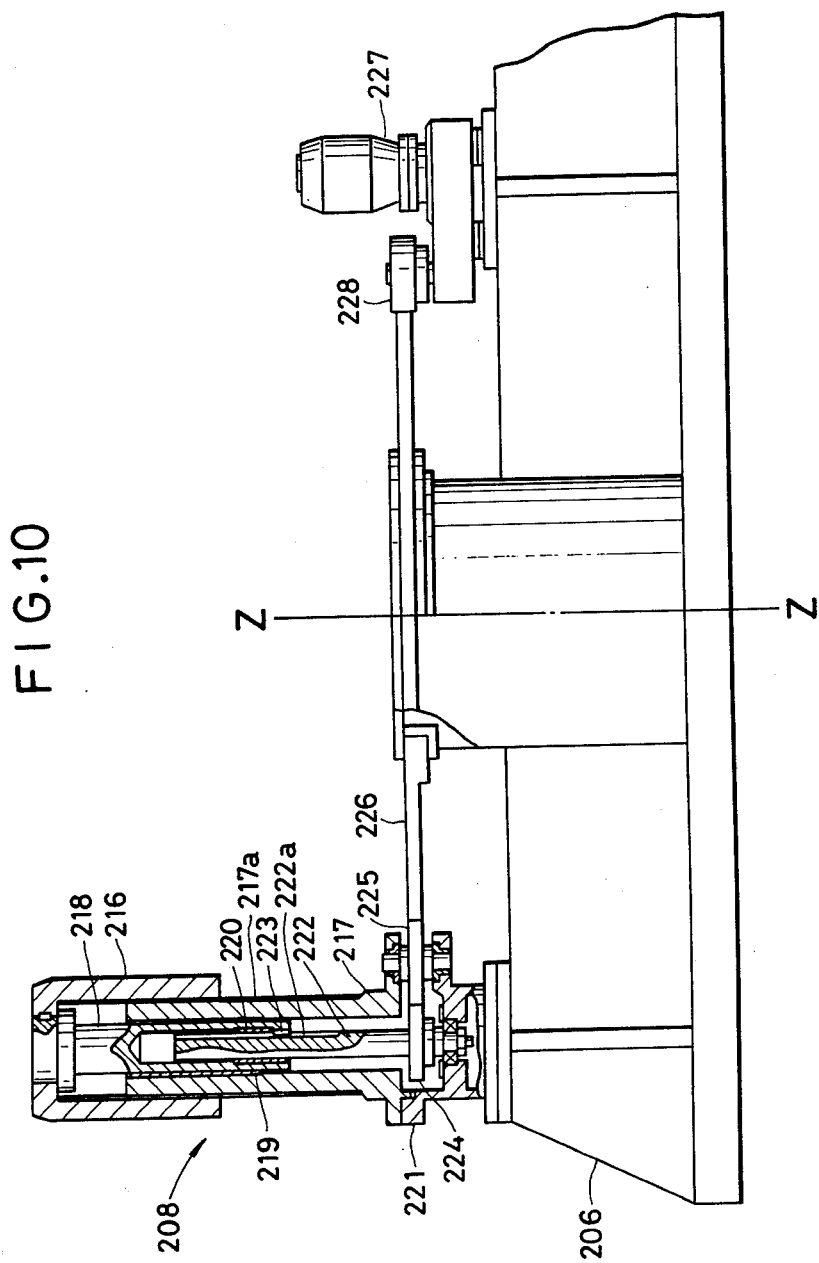

TIRE VULCANIZING PRESS

FIELD AND BACKGROUND OF THE INVENTION

The present invention relates to a tire vulcanizing press and more particularly to an improved hydraulic tire vulcanizing press of the type including an upper frame, a lower frame and both side frames, wherein a die comprising an upper die half and a lower die half is tightly closed by means of a raising and lowering table fixedly secured onto the upper die half, said raising and lowering table being adapted to be raised up or lowered with the aid of a hydraulic press.

A hitherto known hydraulic tire vulcanizing press is generally constructed so that a raising and lowering table has a working stroke of about 1,000 mm in case of tires for a passenger car or about 2,000 mm in case of tires for a truck or like vehicle so as to allow a green tire to be vulcanized to be loaded on the lower die half and therefore a hydraulic cylinder for tightly closing both the die halves is designed to have a correspondingly long working stroke. Accordingly, when there occurs pressure reduction due to leakage of a hydraulic oil from packings on hydraulic line in the vulcanizing press during tire vulcanizing, there is fear of causing an amount of die opening between both the die halves to exceed the specified limitative value, resulting in an occurance of leakage of vulcanizing medium (steam, high pressure and temperature water, high pressure and temperature gas or the like) from the interior of the die. To take remedial activity against malfunctions as described above there have been already made various proposals. One of them is to employ expensive components such as a breach lock ring or like means and another one is to mount a hydraulic control device or the like adapted to be actuated by means of a pressure switch. However, it has been found that any one of these proposals fails to function properly as means for minimizing an amount of die opening between both the die halves.

SUMMARY OF THE INVENTION

Thus, the present invention has been made with the foregoing problems in mind and its object resides in providing an improved tire vulcanizing press which assures a minimal die opening by means of a mechanical arrangement.

Another object of the present invention is to provide an improved vulcanizing press in which the vulcanizing operation is carried out safely.

Another object of the present invention is to provide an improved vulcanizing press which can be manufactured at an inexpensive manufacturing cost.

There is proposed in accordance with an aspect of the invention a tire vulcanizing press of the early mentioned type which is characterized in that a working cylinder and a spacer are arranged between the upper frame and the upper die half, either of said working cylinder and said spacer being adapted to move to a position located outward of the side frame so as to assure that the upper die half is displaced upward without any hindrance encountered, and a die thickness adjusting means is arranged on either of the upper frame and the lower frame.

Further, there is proposed in accordance with another aspect of the invention a tire vulcanizing press of the early mentioned type which is characterized in that in addition to the working cylinder and the spacer a distance plate is arranged between the upper frame and the upper die half, said distance plate being adapted to move to the position located outward of the side frame so as to assure that the upper die half is displaced upward without any hindrance encountered, and a die thickness adjusting means is arranged on either of the upper frame and the lower frame.

Owing to the arrangement that the working cylinder and the spacer are arranged between the upper frame and the upper die half so as to transmit required depressing force to the die by way of the spacer and adjustment can be made with respect to the depressing force reaction receiving portion on the upper frame or the lower frame in response to a variation in thickness of the die it becomes possible to initiate a depressing operation after the clearance between the working cylinder and the spacer as well as between the spacer and the die has been eliminated prior to the depressing operation with the aid of the working cylinder. Thus, an amount of die opening can be confined to less than the expansion of the frame structure caused by the depressing force when there occurs a pressure reduction in the working cylinder due to a failure, an injury or the like so that vulcanizing medium does not leak from the interior of the die. Further, since the working cylinder is designed to have a very short stroke by which expansion of the frame structure can be corrected, die closing can be precisely achieved within a very short period of time.

Owing to the arrangement that the distance plate is displaceable in the above-described manner there is very likelihood of damage or injury to the hydraulic hoses through which hydraulic oil flows, compared with the conventional arrangement where the working cylinder is adapted to move. Another advantageous feature of this arrangement is that operation of the vulcanizing press is carried out more smoothly, because a vertically extending long spacer is replaced by a distance plate as a movable component and thereby the former is fixedly secured to the upper die half.

Further, there is proposed in accordance with still another aspect of the invention a tire vulcanizing press of the earlier mentioned type which is characterized in that a working cylinder and a spacer are arranged between the upper frame and the upper die half, said working cylinder being adapted to move to the position located outward of the side frame so as to assure that the upper die half is displaced upward without any hindrance encountered and said spacer being fixedly mounted on the lower die half in such a manner that its working height can be adjusted in dependence on a thickness of a die to be mounted on the lower frame.

Moreover, there is proposed in accordance with another aspect of the invention a tire vulcanizing press of the earlier mentioned type which is characterized in that in addition to the working cylinder and the spacer a distance plate is arranged between the upper frame and the upper die half, said distance plate being adapted to move to the position located outward of the side frame so as to assure that the upper die half is displaced upward without any hindrance encountered and said spacer being fixedly mounted on the lower die half in such a manner that its working height can be adjusted in dependence on a thickness of a die to be mounted on the lower frame. Since a combination of the working cylinder and the spacer is arranged between the upper frame and the upper die half so that depressing force is transmitted to the die via the spacer of which working height is adjustable in dependence on variation in thickness of a die to be mounted on the lower frame, it becomes possible that the depressing operation is carried out after the clearance between the working cylinder and the spacer as well as between the spacer and the die, is eliminated, prior to initiating the depressing operation. Owing to the arrangement as described above it is assured that an amount of die opening does not exceed a length of expansion of the frame structure caused by depressing force, when there occurs reduction of hydraulic pressure in the working cylinder due to failure, damage or like reason, resulting in an occurance of leakage of vulcanizing medium from the interior of the die being inhibited. Further, since the working cylinder is designed to have a stroke required merely for compensating expansion of the frame structure, a tight die closing can be achieved precisely within a very short period of time. Another advantageous feature of the vulcanizing press is that space required for displacement of the working cylinder can be substantially reduced, because the working cylinder having a short height is adapted to be displaced away from the operative position in the vulcanizing press to the inoperative position located outward of the side frame thereof and vice versa by a turning movement.

Further, since the distance plate is arranged in the above-described manner so as to be displaced away from the operative position in the vulcanizing press to the inoperative position located outward of the side frame thereof and vice versa by the turning movement, there occurs very little damage or injury to hydraulic hoses through which hydraulic oil flows, compared with the case where a working cylinder having a long height is required to be displaced in the same manner as described above. Owing to the arrangement that a distance plate having a thin thickness is adapted to be displaced it is assured that space required for displacement of the distance plate can be substantially reduced.

Other objects, features and advantages of the present invention will be more clearly apparent from reading the following description prepared in conjunction with the accompanying drawings.

BRIEF DESCRIPTION OF THE DRAWINGS

The accompanying drawings will be briefly described below.

FIG. 6 is a front view of a tire vulcanizing press in accordance with the fifth embodiment of the invention.

FIG. 7 is a front view of a tire vulcanizing press in accordance with the sixth embodiment of the invention.

FIG. 8 is a vertical sectional view of an arm turning mechanism for the vulcanizing press in FIG. 7, shown in an enlarged scale.

FIG. 9 is a vertical sectional view of an essential part constituting the vulcanizing press in the fifth embodiment, shown in an enlarged scale, and FIG. 10 is a partially sectioned view of a part of the vulcanizing press in FIG. 6, particularly illustrating the detailed structure of a spacer.

DESCRIPTION OF THE PREFERRED EMBODIMENTS

Now, the present invention will be described in a greater detail hereunder with reference to the accompanying drawings which illustrate preferred embodiments of the invention.

Figure 1:
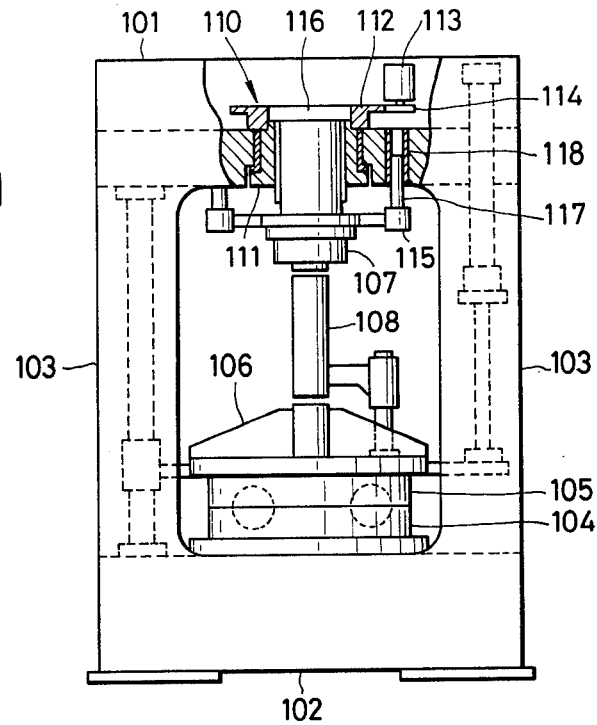
FIG. 1 is a partially sectioned front view of a tire vulcanizing press in accordance with the first embodiment of the invention.

Next, description will be made as to the first embodiment as illustrated in FIG. 1.

In this embodiment the vulcanizing press is designed in a frame type tire vulcanizing press including an upper frame 101, a lower frame 102 and side frames 103 for integrally connecting said upper and lower frames 101 and 102 to one another. A lower die half 104 is fixedly mounted on the lower frame 102 and an upper die half 105 is fixedly secured to the raising and lowering table 106 in such a manner that said upper die half 105 is displaced away from or toward said lower die half 104. Further, a working cylinder 107 and a spacer 108 are disposed between the upper frame 101 and the raising and lowering table 106.

A die thickness adjusting means 110 in accordance with this embodiment is constructed in the following manner. Specifically, the die thickness adjusting means comprises a female threaded sleeve 111 rotatably supported on the upper frame 101, a gear wheel 112 fixedly attached to the upper end part of said female threaded sleeve 111, a pinion 114 meshing with said gear wheel 112 adapted to be rotated by means of a driving device 113 which is firmly mounted at the predetermined position on the upper frame 101, a male threaded rod 116 in screw engagement with the female threaded sleeve 111, said male threaded rod 116 carrying a pair of arms 115 at the lower end part thereof, rods 117 extending upward from the free end of said arms 115 in parallel to the male threaded rod 116 for the purpose of inhibiting rotation of the latter and guide bearings 118 fitted to the upper frame 101 at the predetermined position thereof to slidably bear said rods 117 therethrough.

As is apparent from the drawing, the working cylinder 107 is fixedly secured to the bottom of the die thickness adjusting means 110 and includes an actuating rod projecting downward therefrom. The raising and lowering table 106 is adapted to move up and down along the side frames 103 while it is guided with the aid of a suitable means, and the spacer 108 is swingably supported above the raising and lowering table 106. The swinging portion for the spacer 108 is held in the floated state in such a manner as to move up and down in the axial direction whereby the spacer 108 including the swinging portion is displaceable by a certain distance in the axial direction relative to the vulcanizing press.

Operation of the vulcanizing press constructed in accordance with this embodiment will be described below.

First, the raising and lowering table 106 is lowered so that the upper die half 105 is placed on the lower die half 104. The spacer 108 held at the waiting position located outward of the side frame 103 is then caused to enter the central part of the vulcanizing press and thereafter the male threaded rod 116 is lowered by operating the driving device 113 until the rod of the working cylinder 107 comes in abutment against the uppermost end of the spacer 108. Thus, there disappears any clearance above the spacer 108 as well as below the same. When the working cylinder 107 is actuated to generate the predetermined depressing force, it is transmitted to the upper die half 105 via the spacer 108. Owing to the arrangement of the vulcanizing press an amount of die opening between both the upper and lower die halves 104 and 105 can be limited within a very short distance in the event of unexpected reduction of hydraulic pressure in the working cylinder 107 during vulcanization, resulting in the prevention of leakage of vulcanizing medium therefrom.

After completion of vulcanization, the depressing force is released from the working cylinder 107 and the die thickness adjusting means 110 is then caused to operate a little bit to such an extent that an appreciable clearance appears above the spacer 108 as well as below the same and thereby it can be displaced away therefrom. When the spacer 108 assumes the position located outward of the side frame 103 where there occurs no interference with the upper frame 101 and the working cylinder 107, the raising and lowering table 106 is displaced upward so that a vulcanized tire can be removed from the die.

Figure 2:
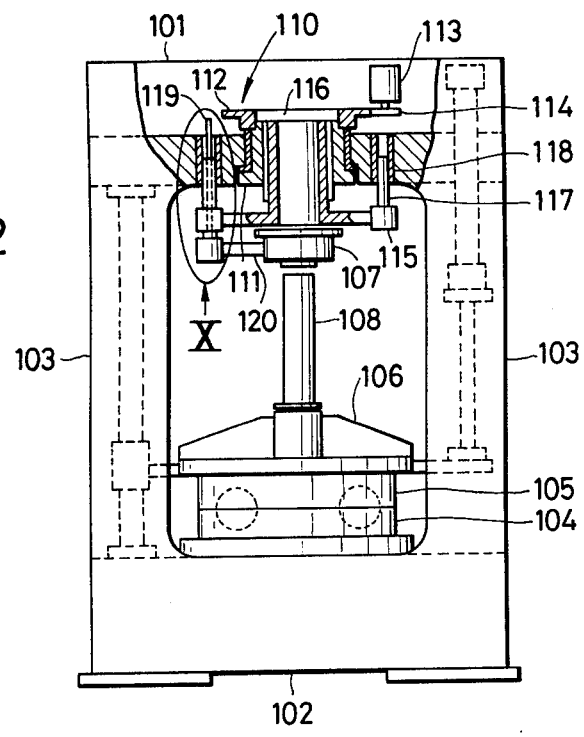
FIG. 2 is a partially sectioned front view of a tire vulcanizing press in accordance with the second embodiment of the invention.
Figure 3:
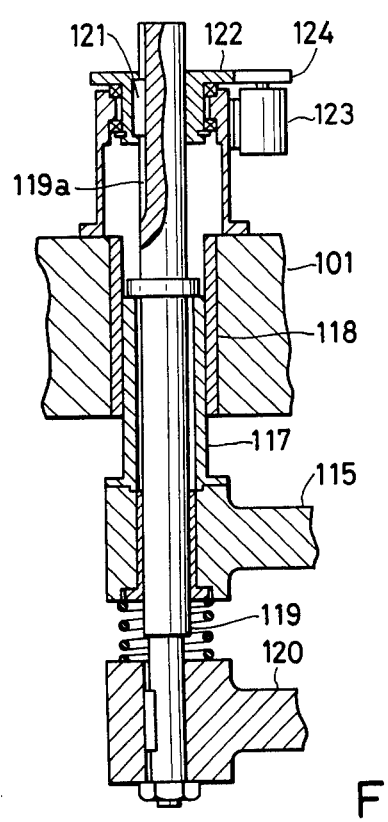
FIG. 3 is a vertical sectional view of the section X in FIG. 2, shown in an enlarged scale.

Next, description will be made as to the second embodiment as illustrated in FIGS. 2 and 3. In this embodiment the same or similar parts and components as those in the first embodiment are identified with the same reference numerals and therefore their repeated description will not be required. Thus, description will be confined only to structure and function different from those in the first embodiment.

In the foregoing first embodiment the working cylinder 107 is fixedly secured to the die thickness adjusting means 110, whereas in this embodiment the working cylinder 107 is supported swingable relative to the die thickness adjusting means 110.

Specifically, the spacer 108 is fixedly mounted on the raising and lowering table 106 and the male threaded rod 116 disposed above the raising and lowering table 106 on an extension line extending upward therefrom is formed with a hole of which inner diameter is dimensioned larger than the outer diameter of the spacer 108. The working cylinder 107 is dimensioned in outer diameter larger than the inner diameter of said hole on the male threaded rod 116 and moreover it is swingably supported by means of the die thickness adjusting means 110 as illustrated in FIG. 3. Namely, one of the rods 117 attached to the arms 115 to prevent the male threaded rod 116 from being rotated is made hollow so that a rod 119 extends through the hollow part of the rod 117 to carry a support arm 120 for the working cylinder 107 at the lowermost end thereof. The support arm 120 is displaceably fitted onto the rod 119 in such a manner as to axially move by a distance substantially equal to the clearance between the upper surface of the working cylinder 107 and the lower end of the male threaded rod 116. Further, the rod 119 has a flange formed at the middle part thereof so that it is held by means of the hollow rod 117 with said flange being placed on the upper end thereof. Moreover, the rod 119 is formed with an axially extending key groove 119a at the upper end part thereof to which a key 121 is fitted whereby a gear wheel 122 rotatably mounted on the upper frame 101 is operatively connected to the rod 119 by way of the key 121 and the key groove 119a. The gear wheel 122 meshes with a pinion 124 adapted to be rotated by means of a driving device 123 fixedly mounted on the upper frame 101. Owing to the arrangement in accordance with this embodiment as described above it is assured that the rod 119 is displaced up and down while the positional relation relative to the arms 115 is maintained irrespective of how the position of the male threaded rod 116 is displaced by means of the driving device 113. Since the working cylinder 107 is constructed to move up and down, depressing operation can be carried out without any hindrance encountered. Further, it should be noted that the working cylinder 107 can be turned by operating the driving device 123 irrespective of the position of the male threaded rod 116. In the drawings reference numeral 118 designates a guide bearing.

As will be readily understood from the above description, the spacer 108 is the first embodiment is replaced with the working cylinder 107 in this embodiment adapted to turn away from or toward the position located in vertical alignment with the die and therefore the substantially same functional effects as those in the first embodiment are obtainable. Thus, this embodiment will be preferably employable in case when there is necessity for providing a space in which a centering mechanism is accommodated for vulcanizing operation at the central part of the raising and lowering table 106 and therefore the arrangement in accordance with the first embodiment cannot be achieved.

Figure 4:
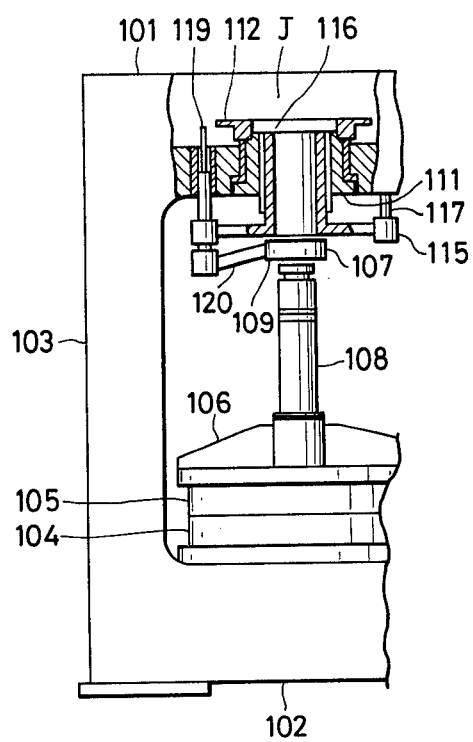
FIG. 4 is a partially sectioned fragmental view of a tire vulcanizing press in accordance with the third embodiment of the invention.

Next, description will be made as to the third embodiment as illustrated in FIG. 4. In the foregoing second embodiment the working cylinder 107 is adapted to turn away from or toward the position located in vertical alignment with the die but this embodiment consists in that an arrangement is made such that a spacer 108 is fixedly mounted on the raising and lowering table 106, a working cylinder 107 is attached to the upper end of said spacer 108 and a turnable distance plate 109 is disposed between the working cylinder 107 and the male threaded rod 116.

It should be of course understood that this embodiment assures the substantially same functional effects as those in the second embodiment and in addition to this there is no fear of causing damage or injury on hydraulic liquid supply hoses as is often the case with the foregoing second embodiment where the working cylinder 107 is adapted to turn at the upper part of the vulcanizing press.

Figure 5:
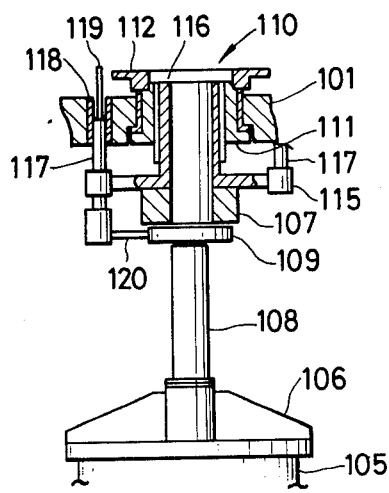
FIG. 5 is a vertical sectional view of an essential part constituting a tire vulcanizing press in accordance with the fourth embodiment of the invention.

Next, description will be made as to the fourth embodiment as illustrated in FIG. 5. In this embodiment the vulcanizing press includes a distance plate 109 as is the case with the foregoing third embodiment and a different thing from the third embodiment consists in that the working cylinder 107 is constructed in the doughnut-shaped configuration and fixedly secured to the male threaded rod 116 but functional effects are substantially the same as those in the third embodiment.

In FIG. 5 plate 109 acts as a blocking means to transmit force form rod 116 to spacer 108. In FIG. 2, the cylinder 107 was the blocking means.

The present invention has been described with respect to the first to fourth embodiments each of which consists in that a spacer 108 and a working cylinder are arranged at the central part of a vulcanizing press. Alternatively, a plurality of spacers and a plurality of working cylinders may be arranged as required. In the above-described embodiments a die thickness adjusting means 110 is disposed in the proximity of the upper frame 101 but the present invention should not be limited only to this. Alternatively, the die thickness adjusting means 110 may be interposed between the lower die half 104 and the lower frame 102 while the working cylinder 107, the spacer 108 and the distance plates 108 are arranged at the upper part of the vulcanizing press.

Next, description will be made as to the fifth embodiment as illustrated in FIGS. 6, 8 and 10. A vulcanizing press in accordance with this embodiment is constructed in a frame type tire vulcanizing press and includes an upper frame 201, a lower frame 202 and side frames 204 by way of which said upper frame 201 and said lower frame 202 are connected to one another. A lower die half 204 is fixedly mounted on the lower frame 202 and an upper die half 205 is fixedly secured to the raising and lowering table 206 so that said upper die half 205 is displaced away from or toward said lower die half. A pair of working cylinders 207 and a pair of spacers 208 are arranged between the upper frame 201 and the raising and lowering table 206. The spacers 208 are fixedly attached to the raising and lowering table 206 and extend upward therefrom, whereas the working cylinders 207 are turnably supported on the upper frame 201 so that they are displaced to the position located outward of the side frame 203 so as not to prevent upward movement of the raising and lowering table 206 and the spacers 208. To allow a working height of the spacers 208 to be adjusted as required, they are designed to expand or contract according to the required height in order to make an adjustment corresponding to the thickness of a die to be mounted.

As is best seen from FIG. 8, the pair of working cylinders 207 are turnably supported below the upper frame 201 so as to assume the first position where upward movement of the spacers 208 is inhibited as illustrated in FIG. 6 and the second position located outward of the side frame 203 where no upward movement of the spacers 208 is inhibited in a reciprocable manner. Specifically, an arm 209 adapted to carry the working cylinders 207 at both the free ends thereof is fixedly fitted onto a shaft 210 with the aid of a key 211 received in an axially extending key groove 210a in such a manner as to move up or down as required, said shaft 210 being rotatably supported on the upper frame 201 while extending therethrough. The shaft 210 is formed with a flange 210b at the middle part thereof and a compressive coil spring 212 is disposed between the flange 210b and the boss 209a of the arm 209 whereby the working cylinders 207 are displaced by an appreciable distance when the spacers 208 are caused to expand upward so as to eliminate clearance and moreover they resume their original position as their expansion is released. Further, the shaft 210 includes a gear wheel 213 on the upper surface of the upper frame 201, said gear wheel 213 meshing with a pinion 215 adapted to be rotated by means of a driving device 214 fixedly mounted on the upper frame 201. Accordingly, the working cylinders 207 can assume the first and second positions as required by way of turning movement, as long as a certain clearance is existent between the bottom of the working cylinders 207 and the upper end surface of the spacers 208.

In the above-described embodiment the working cylinders 207 initiate their operation simultaneously. Alternatively, they may be actuated separately. Further, in the illustrated embodiment two working cylinders 207 are provided for one set of die but a single or three or more than three working cylinders may be employed.

As illustrated in FIG. 10, a plurality of spacers 208 are arranged at the diametrically opposite position on the raising and lowering table 206. Reference numeral 216 designates a female threaded sleeve which is screw fitted onto the male threaded portion 217a of a hollow shaft 217. A rod 218 is firmly fitted to the female threaded sleeve 216 in accordance with a hitherto known method so that it is movably held in the hollow space of the hollow shaft 217 by means of a bearing 219 so as to rotate and moreover move up and down therein while it is guided with the aid of said bearing 219 fitted into the hollow shaft 217. Further, the rod 218 includes a bearing 220 fitted into the hollow portion thereof, said bearing 220 serving to slidably guide a driving shaft 222 in the axial direction which is rotatably supported on a base 221 with the aid of conventional means (said driving shaft 222 being held so as not to move in the vertical direction). The driving shaft 222 is formed with an axially extending key groove 222a adapted to receive a key 223 therein which is fitted to the inner wall of the hollow portion of the rod 218 with the aid of conventional means.

A pinion 224 is fixedly secured to the lower end part of the driving shaft 222 with the aid of conventional means so that it meshes with another pinion 225 which is exposed to the outside through a cutout opening on the junction portion between the hollow shaft 217 and the base 221. Further, the pinion 225 meshes with a gear wheel 226 which is supported rotably about the axis Z - X located at the center of the raising and lowering table 206, said gear wheel 226 meshing with a pinion 228 fitted onto the output shaft of a driving device 227 which is fixedly mounted at the predetermined position on the raising and lowering table 206.

Now, operation of the vulcanizing press in accordance with the embodiment will be described below.

As the driving device 227 is rotated, the gear wheel 226 is caused to rotate whereby the driving shaft 222 is rotated by way of the pinions 224 and 225. The female threaded sleeve 216 operatively connected to the driving shaft 222 by means of the key 223 is then rotated so that the working height of the spacer 208 can be adjusted as required. As the female threaded sleeve 216 is rotated, the rod 218 is raised up or lowered without any hindrance encountered, because the key 223 fitted to the rod 218 is adapted to move up or down along the vertically extending long key groove 222a. Thus, a plurality of spacers 208 arranged on a circular track about the gear wheel 226 are caused to expand or contract simultaneously.

In the illustrated embodiment the spacers 208 are driven by the gear wheel 226 for their expansive or contractive movement. Alternatively, the pinion 225 may mesh directly with the pinion 228 on the output shaft from the driving device 227 in case of a small type vulcanizing press including a single spacer 208 mounted thereon.

After completion of vulcanization depressing force is released from the working cylinders 207 and the spacers 208 are then caused to contract by an appreciable distance so that close clearance is formed between the bottom surface of the working cylinders 207 and the top end surface of the spacers 208 as well as between the upper surface of the working cylinders 207 and the upper frame 201 whereby the working cylinders 207 can be displaced from the first position to the second position by turning movement. Thereafter, the raising and lowering table 206 is raised up with the aid of conventional means so that the spacers 208 are accommodated in a hole on the upper frame 201 respectively and thereby the upper die half 205 is parted away from the lower die half 204. Now, a vulcanized tire is ready to be removed from the lower die half 204.

Next vulcanizing operation is carried out by way of the steps of loading a green tire on the lower die half 204, causing the raising and lowering table 206 to be lowered together with the upper die half 205 until the latter is placed on the lower die half 204 in the closed state, causing the working cylinders 207 to resume the first position by turning movement, expanding the spacers 208 by a predetermined distance until clearance between the upper frame 201 and the working cylinders 207 as well as the working cylinders 207 and the spacers 208 disappears and finally actuating the working cylinders 207 so as to tightly close both the upper and lower die halves by depressing force transmitted via the spacers 208 and the raising and lowering table 206. Incidentally, the limitative position at expansive or contractive movement of the spacers 208 can be detected by detecting rotation of the pinion 225, the gear wheel 226 or the pinion 228 with the aid of a pulse generator or the like means so as to stop operation of the driving device 227. Further, in case when a die is replaced with another die having a different thickness adjustment can be made merely by changing a preset value of the pulse generator.

Finally, description will be made as to the sixth embodiment as illustrated in FIGS. 7 and 9.

In the foregoing fifth embodiment an arrangement is made such that a plurality of working cylinders 207 are displaced from the operative position to the inoperative one and vice versa by turning movement, whereas in this embodiment another arrangement is made such that a plurality of distance plates 230 are displaced in the same manner as the working cylinders in the foregoing embodiment. Further, each of the working cylinders 207' is designed in a doughnut-shaped cylinder with a hole formed thereon of which inner diameter is dimensioned larger than the outer diameter of the spacers 208. Alternatively, a doughnut-shaped working cylinder 207' may be replaced with a plurality of working cylinders 260 of which actuating rod is operatively connected to a doughnut-shaped circular plate 250 as schematically illustrated in FIG. 9. In this embodiment the distance plates 230 are displaced from the operative position to the inoperative one and vice versa by turning movement with the aid of the substantially same turning mechanism as illustrated in FIG. 8. Namely, the working cylinders 207 on the arm 209 in the foregoing embodiment are replaced with the distance plates 230 in this embodiment.

This embodiment is identical to the foregoing one in structure and function with the exception that the working cylinders 207' or a combination of the doughnut-shaped circular plates 250 and the working cylinders 260 are fixedly mounted on the upper frame 201 and the distance plates 230 are turnable instead of the working cylinders 207'. As the raising and lowering table 206 is raised up, each of the spacers 208 moves upward through a hole on the doughnut-shaped working cylinders 207' or the doughnut-shaped circular plates 250.

As will be apparent from the above description, the vulcanizing press in accordance with the present invention has the following characterizing features.

(1) Since there is no necessity for allowing the long spacers 208 to be displaced away from the operative position, a space located behind the vulcanizing press can be utilized usefully.

(2) Since the spacers 208 are designed in an expansive and contractive type, any clearance can be reduced to zero prior to initiating depressing operation. Further, since an amount of die opening in the event of an occurance of leakage of vulcanizing medium is confined within a very short distance, it is assured that vulcanizing operation is carried out safely.

(3) Since an arrangement is made such that depressing force is exerted on a die at the position remote from the upper frame and in the proximity of the side frames (in case when a plurality of spacers are employed), an inexpensive frame structure is achieved.

(4) When a die is replaced with another die having a different thickness, adjustment can be reliably made by remote control with ease.

What is claimed is:

1. A tire vulcanizing press including an upper frame, a lower frame and side frames by way of which said upper frame and said lower frame are integrally connected to one another, wherein a lower die half is fixedly mounted on the lower frame and an upper die half is fixedly secured to a raising and lowering table adapted to be raised up or lowered by means of a raising and lowering means fixedly attached to the upper frame in such a manner that the upper die half is displaced away from or toward the lower die half, characterized in that a working cylinder and a spacer are arranged between the upper frame and the upper die half, turning means connected to said working cylinder to move said working cylinder to a position located outward of the side frames so that the upper die half is displaceable upwardly without any hindrance, said spacer being fixedly mounted on the upper die half and having height adjustment means connected thereto for changing a working height of said spacer in dependence on a thickness of a die to be mounted on the lower frame.

2. A tire vulcanizing press as defined in claim 1, characterized in that a plurality of working cylinders and a plurality of spacers are arranged between the upper frame and the upper die half, said turning means connected to each working cylinder and each space having height adjustment means.

3. A tire vulcanizing press as defined in claim 2, characterized in that the working cylinders are carried on both the ends of an arm which is rotatably supported below the upper frame, said arm forming said turning means.

4. A tire vulcanizing press as defined in claim 3, characterized in that the height adjusting means for each spacer includes a female threaded sleeve adapted to be rotated by means of a driving device so as to move upward or downward, said female threaded sleeve being screw fitted onto a male threaded hollow shaft fixedly mounted on the raising and lowering table and rotation of said driving device being transmitted to the female threaded sleeve by way of a driving shaft vertically extending through said male threaded hollow shaft.

5. A tire vulcanizing press as defined in claim 1, characterized in that said turning means includes an arm connected to said working cylinder and means connected between said arm and the upper frame for permitting relative rotation and axial movement between said arm and the upper frame to accommodate a clearance between said working cylinder and said spacer.

6. A tire vulcanizing press comprising:

a frame having an upper part, a lower part and at least two side parts fixedly connected between said upper part and said lower part;

a lower die fixedly mounted to said lower part;

an upper die;

a table fixed to said upper die;

upper die moving means connected between said table and said frame for moving said upper die upwardly and downwardly with respect to said lower die;

a spacer extending vertically from a top of said table toward said upper part of said frame;

a threaded sleeve rotatably mounted to said upper part;

a threaded part threadably received in said threaded sleeve for vertical movement with respect to said upper part, said threaded rod having an opening therethrough of a diameter to receive said spacer and having a lower surface around said opening against which pressure to be exerted on said spacer and to said upper die can be received;

blocking means pivotally mounted to said upper part of said frame and mounted to said upper part of said frame for limited vertical movement, said blocking means having an operative position between said threaded rod and said spacer and an inoperative position away from a space between said threaded rod and said spacer; and a working cylinder connected to one of said blocking means and said threaded rod and activatable to exert a pressure between said lower surface of said threaded rod and said spacer.

7. A vulcanizing press according to claim 6, wherein said blocking means includes an arm, a connecting rod connected to said arm and mounted to said upper part of said frame for rotation and for axial movement.

8. A vulcanizing press according to claim 7, including drive means connected to said frame and engaged with said threaded sleeve for rotating said threaded sleeve to move said threaded rod upwardly and downwardly to adjust a space between said lower surface of said threaded rod and said spacer.

9. A vulcanizing press according to claim 8, including a second arm connected to said threaded rod and extending outwardly from said opening in said threaded rod, said second arm receiving said connecting rod for axial movement and for rotation.

10. A vulcanizing press according to claim 9, wherein said working cylinder is connected to said first-mentioned arm and forms a part of said blocking means.

11. A vulcanizing press according to claim 9, wherein said blocking means comprises a distance plate connected to said first-mentioned arm, said working cylinder fixed to said threaded rod at said lower surface thereof and having an opening therethrough aligned with said opening of said threaded rod for receiving said spacer.

* * * * *